United States Patent [19]

Jaeckel et al.

[11] Patent Number: 4,917,857
[45] Date of Patent: Apr. 17, 1990

[54] PROCESS FOR PRODUCING METALLIC OR CERAMIC HOLLOW-SPHERE BODIES

[75] Inventors: Manfred Jaeckel, Loxstedt; Hartmuth Smigilski, Hamburg, both of Fed. Rep. of Germany

[73] Assignee: Norddeutsche Affinerie Aktiengesellschaft, Hamburg, Fed. Rep. of Germany

[21] Appl. No.: 218,239

[22] Filed: Jul. 12, 1988

[30] Foreign Application Priority Data

Jul. 22, 1987 [DE] Fed. Rep. of Germany ....... 3724156

[51] Int. Cl.$^4$ ............................................... B22F 7/02
[52] U.S. Cl. .......................................... 419/9; 419/35; 419/36; 427/6; 264/45.3
[58] Field of Search .......................... 419/9, 35, 36, 37; 264/45.3; 427/6

[56] References Cited

U.S. PATENT DOCUMENTS

| 3,528,809 | 9/1970 | Farnand et al. ......................... 75/222 |
| 3,975,194 | 8/1976 | Farnand et al. ......................... 75/222 |
| 4,569,821 | 2/1986 | Duperray ................................ 419/2 |

FOREIGN PATENT DOCUMENTS 0119913 9/1984 European Pat. Off. .
2355498 5/1975 Fed. Rep. of Germany .
3210770 9/1983 Fed. Rep. of Germany .
1266824 6/1961 France .
2151055 4/1973 France .
2055787 11/1972 United Kingdom .

Primary Examiner—Brooks H. Hunt
Assistant Examiner—Ngoclan T. Mai
Attorney, Agent, or Firm—Herbert Dubno

[57] ABSTRACT

Metallic or ceramic hollow spheres are produced by applying a solid layer to a substantially spherical particle of foamed polymer and the coated polymer cores are pyrolyzed with formation of vapor. In order to permit an economical production of the hollow spheres and a wide selection from a wide range of metallic or ceramic materials, the particles consisting of foamed polymer are treated in a state of agitation with an aqueous suspension which contains dissolved or suspended binder and metallic and/or ceramic powder particles, whereby a coating is formed on said polymer particles. The coating is dried, the polymer particles and least part of the binder are subsequently pyrolyzed at temperatures from 400° to 500° C. with formation of vapor while they are agitated and the resulting metallic and-/or ceramic hollow spheres are sintered at temperatures from 1000° to 1500° C. while they are agitated.

10 Claims, 1 Drawing Sheet

PROCESS FOR PRODUCING METALLIC OR CERAMIC HOLLOW-SPHERE BODIES

FIELD OF THE INVENTION

Our present invention relates to a process for producing metallic or ceramic hollow spheres wherein a solid layer is applied to a substantially spherical core particle of a foamed polymer and the coated polymer cores are pyrolyzed to evaporate them from within the solid layer.

BACKGROUND OF THE INVENTION

German Patent No. 32 10 770 discloses for the production of substantially spherical lightweight particles of metal, a process in which particles of foamed plastics, such as commercially available expanded polystyrene, are metallized, e.g., with copper, silver or nickel in an electroless process and the plastic cores are pyrolytically decomposed at temperatures of about 400° C. The wall thickness of the particles can be electrochemically increased to about 0.05 mm by electrodeposition thereon.

Published German Application No. 23 55 498 discloses for the production of a catalyst carrier consisting of a spongelike ceramic body a process in which foamed polystyrene spheres packed in a bed are bonded at their contacting surfaces at elevated temperatures to form a skeleton of spheres, and the interstices of the skeleton of spheres are completely filled with an aqueous suspension of ceramic material, the ceramic material filling the interstices of the skeleton of spheres is dried, the foamed polystyrene spheres are removed by pyrolysis and the remaining ceramic skeleton is heated nd sintered at temperatures from 1000° to 1500° C. The ceramic material which is used can consist of highly reactive alumina or of alumina and e.g. of highly reactive alumina or of alumina and bentonite. A dispersing agent is added to the ceramic dispersion in order to increase its fluidity.

European Patent Publication No. 119,913 discloses for the production of inorganic porous bodies a process in which spheres are produced of a porous material and have been coated with an organic binder, such as a thermoplastic polymer and with an inorganic material, such as metal or ceramics. The coated spheres are compacted cold to form a shaped body, which is heat-treated in a vacuum in order to vaporize the porous material and the organic binder, and the resulting hollow spheres are subsequently sintered.

French Patent No. 1,266,824 discloses for the production of porous metal bodies a process in which an organic binder, such as methyl methacrylate, is added to a mixture or a fine metal powder and organic particles consisting of hollow microspheres made of phenol-formaldehyde resin or other organic substances, the hardened mixture is heat-treated to vaporize the organic hollow microspheres and the organic binder and the resulting hollow spheres of metal are subsequently sintered.

OBJECTS OF THE INVENTION

It is an object of the invention to provide an improved economical process for producing substantially spherical hollow bodies, which consist of metal or ceramics and have a dense or microporous shell of high strength.

Another object is to provide an improved method of making a reticulate metal or ceramic structure.

SUMMARY OF THE INVENTION

These objects are attained in accordance with the invention in a process for producing metallic or ceramic hollow spheres wherein a solid layer is applied to a substantially spherical particle of a foamed polymer and the coated polymer cores are pyrolyzed with formation of vapor.

According to the invention, the particles consisting of foamed polymer, preferably of expanded polystyrene, are agitated with an aqueous suspension which contains dissolved or suspended binder and metallic and/or ceramic powder particles, whereby a coating is formed on the polymer particles, the coating is dried, and the polymer particles and least part of the binder can be subsequently pyrolyzed at temperatures from 400° to 500° C. with formation of vapor while they are agitated. The resulting metallic and/or ceramic hollow spheres can be sintered at temperatures from 1000° to 1500° C. while they are agitated.

In the process in accordance with the invention the substantially spherical particles preferably consisting of expanded polystyrene and having a diameter from 1 to 8 mm can be charged into a fluidized bed reactor. The aqueous dispersion of the treating material is introduced into the fluidized bed which is formed by the foamed polystyrene spheres. The duration of the processing will depend on the coating thickness desired and the temperature of the fluidizing gas, which is at a temperature between 70° and 120° C. The application and drying of the coating are generally completed within a time from 5 to 60 minutes. It is preferably to select such a temperature that the processing will be completed within about 10 to 30 minutes.

The powder particles employed consist of ceramic and/or metallic materials and have a particle size from 0.001 to 0.2 mm. The selected particle size will depend on the purpose for which the hollow spheres are to be used. If a formation of dense spherical shells is desired, particles will be used which have a particle size in the lower portion of the stated range. Microporous spherical shells can more easily be obtained with particles having a size in the upper region of the stated range.

Powder particles consisting of ceramic materials are particularly selected from the compounds of the group $Al_2O_3$, $SiO_2$, $Cr_2O_3$, $ZrO_3$, $SiC$ and $Si_3N_4$.

Metallic powder particles are selected from metals of the group Fe, Co, Ni, Cu, W, Mo, noble metals (e.g. gold, platinum, iridium) and hard metals (e.g. titanium and tantalium).

Alteratively, mixtures of components from one or both of the stated groups of materials may be used. For a production of metal-containing ceramic hollow spheres it is often possible to use metal powders and the corresponding metal oxide powders or combinations thereof. Particularly elements which form easily reducible oxides, such as Fe, Ni, Co, Cu, noble metals, W and Mo, can be used in the form of the oxides and can be reduced to elemental metal at least in part during the sintering process.

The organic binders which are contained as solutes in the aqueous dispersion may be selected from a large number of polymers. Particularly preferred organic polymers are selected from the group which consists of polyethylene, polyacrylate, polyvinyl acetate, polyvinyl alcohol, polyvinyl chloride, polybutyral, polyamide, cellulose ester, phenol resin, amino resin and epoxy resins. Particularly suitable binders consist of polyacrylates and cellulose esters. By means of simple experiments it is easy to determine the binder which is most desirable in view of the selected powder material and the pyrolysis and sintering conditions required for the powder material.

The aqueous dispersion should have a binder content from 3 to 15% by weight related to the powder material contained in the dispersion.

The foamed polystyrene spheres are treated in the fluidized bed reactor in such a manner that a powder layer will be formed which in a dry state has a thickness from 0.01 to 2 mm.

If the kind and content of the binder and the thickness of the coating are properly selected, the dried powder coating will have an adequate strength so that the coated foamed plastic particles, which are substantially spherical, can be decomposed by a pyrolysis by which the spherical shape of the powder shell will not be deformed.

During the pyrolysis of the coated core of foamed plastic, the binder of the powder coating is also vaporized so that a self-supporting hollow sphere having a porous shell structure will be left if the pyrolysis is effected at temperatures between 400° and 600° C. The vaporized core and binder material escapes through the porous shell.

Depending upon the nature of the powder which is used, the pyrolysis of the coated particle of foamed plastic may be carried out in air or inert gas or under reducing conditions. A heating for 1 to 3 hours will be required at a temperature of about 500° C.

Where metal powders are used, the so-called green strength (pre-sintering strength) may be increased by effecting pyrolysis under slightly oxidizing conditions so that solid carbon is removed to a higher degree and a strength-increasing oxide skin is formed on the surfaces of the metal powder particles.

The pyrolytic processing serves to remove the coated polymer core as well as at least part of the organic binder and is followed by a sintering process at a temperature from 1000° to 1500° C. These pyrolytic and sintering steps may be carried out in the same unit, such as a fluidized bed reactor, which has been used for the coating treatment if that unit is properly equipped. Alternatively, it may be desirable to effect the pyrolytic and sintering processing in a different unit, such as a rotary kiln or a raking furnace. The atmosphere in the furnace unit may be selected in consideration of the powder material used to form the coating. For this reason it is possible to operate in a vacuum and/or under oxidizing or reducing conditions or under an inert gas.

Instead of agitating the individual hollow spheres in order to prevent them from being sintered to each other, the same result may be produced in that the hollow spheres are coated on the outside with an inert powder which at the temperature employed will not undergo a chemical or physical reaction with the material of the hollow sphere. After the sintering treatment such inert powders can easily be removed from the hollow spheres by mechanical or chemical processing or they may constitute a backing for supporting the hollow sphere proper during the pyrolytic and sintering processing, particularly if the hollow spheres have a very small wall thickness or the powder layer which constitutes the hollow sphere proper does not yet have an adequate green strength after the pyrolysis.

Depending upon the material of the hollow spheres, suitable inert powders may consist of carbon, aluminum hydroxide or chalk.

In a further embodiment of the invention the pyrolysis and sintering may be performed without a continuous agitation of the coated foamed plastic particles. In that case the coated foamed plastic particles are charged into a mold which has perforated walls and under the action of thermal energy (at about 100° C.) and, if desired, of mechanical pressure the foamed plastic particles are "afterfoamed" so that the mold is filled to a higher degree and the particles are compacted and bonded. When the mold has been cooled its content can be removed as a dimensionally stable body, which can be handled. In that case the molding has such a high "green strength" that it will not be deformed when it is pyrolyzed and subsequently sintered at temperatures from 1000° to 1700° C.

In this embodiment of the invention lightweight bodies are obtained which have a high strength and comprise open or closed cells. In dependence on the kind and density of the powder materials the lightweight bodies will have specific gravities between 0.2 and 1 $g/cm^3$, cell diameters between 1 and 8 mm and cell walls having a thickness between 0.01 and 0.2 mm. Such lightweight bodies can particularly be used in the manufacture of filter bodies and of catalyst carriers Other fields of application are lightweight building bricks of ceramic materials for use in the construction of furnaces. The materials which are suitable for commercial use are $Al_2O_3$, $ZrO_2$, $SiO_2$ and $SiC$.

BRIEF DESCRIPTION OF THE DRAWING

The above and other objects, features and advantages of my invention will become more readily apparent from the following description, reference being made to the accompanying highly diagrammatic drawing in which.

SPECIAL DESCRIPTION

Figure 1A:
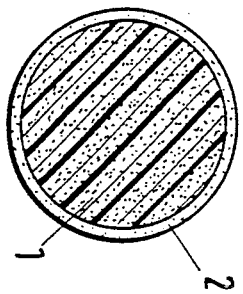
FIG. 1a is a cross sectional view showing the coating of the polystyrene spheres.
Figure 1B:
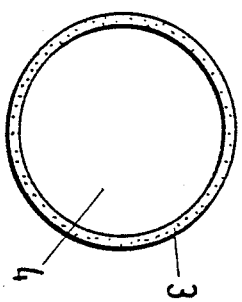
FIG. 1b shows the shell formed by the coating prior to sintering but after pyrolysis.
Figure 1C:
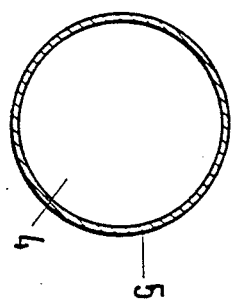
FIG. 1c is a cross sectional view showing the sintered hollow particle.

FIG. 1a is a sectional view showing a substantially spherical foamed plastic particle 1, which is provided with a coating 2 consisting of solid powder and binder. FIG. 1b shows the partly consolidated powder layer 3 after the pyrolytic processing. That powder layer 3 encloses the cavity 4. FIG. 1c shows the particle of FIG. 1b after the sintering. The sintered layer 5 encloses the cavity 4.

Figure 2A:
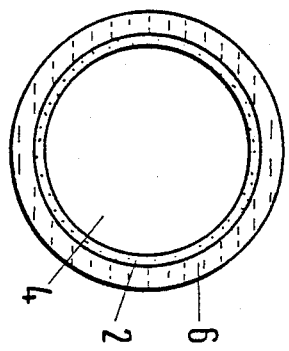
FIGS. 2a and 2b are cross sectional views illustrating the fabrication of a particle utilizing an inert powder layer which can be removed after sintering and preventing the fusion of the particle into a block or other multi-particle coherent structure.
Figure 2B:
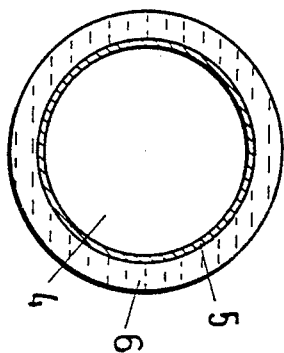

FIG. 2a shows a particle after the pyrolysis of the foamed plastic. The cavity 4 is enclosed by a partly consolidated powder layer 2. An inert powder layer 6 has been applied to the powder layer 2. FIG. 2b shows a sintered layer 5, which encloses the cavity 4. The inert powder layer 6 is still loose and can be removed by mechanical or chemical processing.

Figure 3:
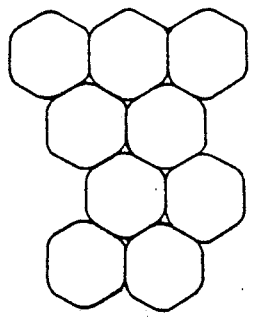
FIG. 3 is a diagram illustrating a sponge-like coherent structure formed from a multiplicity of such particles in a cross-pact arrangement.

FIG. 3 shows a sintered structure consisting of approximately dodecahedron-shaped individual cells.

SPECIFIC EXAMPLES

The invention will be explained in greater detail and by way of example in the following Examples.

EXAMPLE 1

Production of Hollow Spheres of Copper

Commercially available polystyrene granules which contain an expanding agent (e.g. STYROPOR VO 203 of BASF AG, particle size about 1 mm) are prefoamed in boiling water.

The resulting granules of foamed plastic are substantially spherical and have a size of 3.5 to 4 mm. When the spheres have been separated from the water and dried they have a specific gravity of about 20 g/liter.

About 2 liters of the foamed plastic granules are charged into a fluidized bed apparatus for laboratory use (e.g. the apparatus available from AEROMATIC, CH-4416 Bubendorf, Switzerland) and are coated with a dispersion that contains copper powder until about 300 g powders have been applied per liter. The composition of that dispersion 1er liter is about 400 g Cu powder, particle size about 0.001 mm; 10 g cellulose ester (e.g., TYLOSE C30 of Hoechst AG); 80 g aqueous dispersion of 50% polyacrylate (PLEXTOL P 540 of Röhm GmbH); about 900 g distilled water.

When the foamed plastic spheres have been coated for about 20 minutes with the dispersion that contains copper powder and binder, they are heated in a pyrolysis furnace at 500° C. for 2 hours. The resulting hollow spheres of copper oxide have not stuck together and are subsequently reduced at 600° to 800° C. and sintered in a furnace in a hydrogen atmosphere or a mixed nitrogen-hydrogen atmosphere to hollow spheres of copper of high strength.

EXAMPLE 2

Production of Sponge Iron Bodies

Using the procedure described in Example 1, foamed plastic spheres coated with about 300 grams iron powder are made. The dispersion of iron powder is prepared with the same formula as in Example 1 with the difference that the 400 g copper powder are replaced by 400 g iron powder having a diameter from 2 to 8 microns.

The resulting coated foamed plastic spheres are charged into a slab mold composed of aluminum and having inside dimensions of 150 mm × 150 mm × 30 mm. The front and rear walls of the mold are formed with regularly spaced apart bores of 8 diameter. When the mold has been charged it is immersed into and kept for about 2 minutes in boiling water to effect an afterfoaming. The mold is subsequently cooled and opened and the molded slab is removed and dried at 85° C. for 3 hours.

In order to remove the Styropor cores and the binder, a pyrolytic processing is effected in a furnace under reducing conditions (nitrogen-hydrogen atmosphere) at about 500° C. and that processing is immediately succeeded by a sintering at about 1100° C. for 1 hour in the same furnace. A subsequent cooling resulted in a sponge iron body which had a specific gravity of about 0.45 g/cm$^3$ and a high strength.

EXAMPLE 3

Production of Sponge $Al_2O_3$ Bodies

In the same procedure as in Example 1, foamed plastic particles consisting of expanded polystyrene are coated. For that purpose, 2 liters (20 g) of foamed plastic particles which are about 3 mm in diameter are coated with 200 g alumina having a particle size from 0.001 to 0.005mm. The binder and dispersion system is the same as in Example 1 but instead of copper powder contains 400 g alumina powder (type ZPS-402 of Martinswerk in Bergheim near Cologne, West Germany).

The after/foaming to form a slab is effected in the manner described in Example 2.

The pyrolysis of the molding is effected at 500° C. for 4 hours. This is succeeded by a sintering in a high-temperature furnace at 1700° C. for 1 hour.

Cooling results in a lightweight sponge ceramic body of high strength.

We claim:

1. A process for producing metallic or ceramic hollow spheres which comprises the steps of:
   (a) agitating, in a fluidized bed reactor, particles of expanded polystyrene with an aqueous suspension which contains dissolved or suspended or organic binder and metallic and/or ceramic powder particles, whereby a coating is formed on said expanded polystyrene particles;
   (b) drying said coating;
   (c) pyrolyzing the expanded polystyrene of said particles and at least part of the binder at a temperature from 400° to 500° C. form hollow spheres; and
   (d) sintering the metallic or ceramic hollow spheres at a temperature from 1000° to 1500° C.

2. The process defined in claim 1 wherein said powder particles are selected from materials or the group which consists of $Al_2O_3$, $SiO_2$, $CR_2O_3$, $ZrO_2$, SiC and $Si_3N_4$.

3. The process defined in claim 1 wherein said powder particles are selected from the group which consists of Fe, Co, Ni, Cu, W, Mo, noble metals and hard metals.

4. The process defined in claim 1 wherein said organic binder is selected from the group which consists of polyethylene, polyacrylate, polyvinyl acetate, polyvinyl alcohol, polyvinyl chloride, polybutyral, polyamide, cellulose ester, phenol resin, amino resin and epoxy resins.

5. The process defined in claim 1 wherein said powder has a particle size from 0.0001 to 0.2 mm.

6. The process defined in claim 1 wherein said coating has a thickness from 0.01 to 0.2 mm in a dry state.

7. A process for producing metallic or ceramic hollow spheres which comprises the steps of:
   (a) agitating particles of expanded polystyrene with an aqueous suspension which contains dissolved or suspended binder and metallic and/or ceramic powder particles, whereby a coating is formed on said expanded polystyrene particles;
   (b) drying said coating;
   (c) pyrolyzing the expanded polystyrene of said particles and at least part of the binder at a temperature from 400° to 500° C. to form hollow spheres; and
   (d) sintering the metallic or ceramic hollow spheres at a temperature from 1000° to 1500° C., the hollow spheres being agitated during sintering.

8. A process for producing metallic or ceramic hollow spheres which comprises the steps of:

(a) agitating particles of expanded polystyrene with an aqueous suspension which contains dissolved or suspended binder and metallic and/or ceramic powder particles, whereby a coating is formed on said expanded polystyrene particles;
(b) drying said coating;
(c) pyrolyzing the expanded polystyrene of said particles and at least part of the binder at a temperature from 400° to 500° C. to form hollow spheres; and
(d) sintering the metallic or ceramic hollow spheres at a temperature from 1000° to 1500° C., the particles being agitated in step (c) during pyrolysis.

9. A process for producing metallic or ceramic hollow spheres which comprises the steps of:
(a) agitating particles of expanded polystyrene with an aqueous suspension which contains dissolved or suspended binder and metallic and/or ceramic powder particles, whereby a coating is formed on said expanded polystyrene particles;
(b) drying said coating;
(c) pyrolyzing the expanded polystyrene of said particles and at least part of the binder at a temperature from 400° to 500° C. to form hollow spheres; and
(d) sintering the metallic or ceramic hollow spheres at a temperature from 1000° to 1500° C., said aqueous dispersion having a binder content from 3 to 15% by weight relative to said powder.

10. A process for producing metallic or ceramic hollow spheres which comprises the steps of:
(a) in a fluidized bed reactor agitating particles of expanded polystyrene with an aqueous suspension which contains dissolved or suspended organic binder and metal oxide powder particles selected from easily reducible oxides of metals of the group Fe, Ni, Co, Cu, noble metals, W and Mo, whereby a coating is formed on said polymer particles of expanded polystyrene;
(b) drying said coating;
(c) pyrolyzing the polymer of said coated particles and at least part of the organic binder at a temperature from 400° to 500° C. to form hollow spheres; and
(d) sintering the metal oxide hollow spheres at a temperature from 1000° to 1500° C. under reducing conditions.

* * * * *